US011593559B2

(12) United States Patent
Zhang et al.

(10) Patent No.: US 11,593,559 B2
(45) Date of Patent: Feb. 28, 2023

(54) ENHANCED NATURAL LANGUAGE QUERY SEGMENT TAGGING

(71) Applicant: Microsoft Technology Licensing, LLC, Redmond, WA (US)

(72) Inventors: Xiaohai Zhang, San Francisco, CA (US); Haifeng Zhao, San Jose, CA (US); Yang Chen, Sunnyvale, CA (US); Michael A. Menarguez, Dublin, CA (US); Liang Zhang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 735 days.

(21) Appl. No.: 16/455,389

(22) Filed: Jun. 27, 2019

(65) Prior Publication Data
US 2020/0410053 A1    Dec. 31, 2020

(51) Int. Cl.
| | | |
|---|---|---|
| *G06F 40/295* | (2020.01) | |
| *G06N 3/08* | (2023.01) | |
| *G06F 16/35* | (2019.01) | |
| *G06F 16/33* | (2019.01) | |
| *G06F 16/31* | (2019.01) | |
| *G06N 3/02* | (2006.01) | |

(52) U.S. Cl.
CPC .......... *G06F 40/295* (2020.01); *G06F 16/313* (2019.01); *G06F 16/33* (2019.01); *G06F 16/35* (2019.01); *G06N 3/02* (2013.01); *G06N 3/08* (2013.01)

(58) Field of Classification Search
CPC ...... G06F 40/295; G06F 16/313; G06F 16/33; G06F 16/35; G06F 16/9532; G06F 40/284; G06N 3/02; G06N 3/08; G06N 3/0445; G06N 3/0481; G06N 3/0454; G06N 3/084
See application file for complete search history.

(56) References Cited

U.S. PATENT DOCUMENTS

| | | | |
|---|---|---|---|
| 9,875,440 B1 * | 1/2018 | Commons .......... | G01C 21/3602 |
| 10,354,184 B1 * | 7/2019 | Vitaladevuni ...... | G06Q 30/0251 |
| 11,093,714 B1 * | 8/2021 | Bhatia .................. | G06N 3/0454 |
| 2018/0018585 A1 * | 1/2018 | Marin ..................... | G06N 20/00 |
| 2018/0052849 A1 * | 2/2018 | Jagmohan ............... | G06F 40/30 |
| 2018/0181592 A1 * | 6/2018 | Chen .................... | G06F 16/5838 |
| 2018/0300400 A1 * | 10/2018 | Paulus ................. | G06N 3/0454 |
| 2019/0236148 A1 * | 8/2019 | DeFelice ............... | G06F 40/216 |

* cited by examiner

*Primary Examiner* — Pierre M Vital
*Assistant Examiner* — Andrew N Ho
(74) *Attorney, Agent, or Firm* — NDWE, LLP (57) ABSTRACT

Computer-implemented techniques for enhanced tagging of natural language queries that are initially segmented and tagged by a named entity recognition system. By doing so, enhanced tagging of a natural language query that represents a deeper understanding of the query is provided. The enhanced tagging improves the operation of search engines that use the enhanced tags by enabling the search engine to identify and return more relevant search results in answers to natural language queries.

20 Claims, 3 Drawing Sheets

ENHANCED NATURAL LANGUAGE QUERY SEGMENT TAGGING

TECHNICAL FIELD

The present disclosure generally relates to data processing environments and, more particularly, to computer-implemented techniques for enhanced natural language query segment tagging.

BACKGROUND

Computers are very powerful tools for performing a wide-variety of data processing tasks. One data processing task computers are very useful for is searching for relevant information among a corpus of information. Inverted indexes are common mechanism for efficiently identifying information of interest among a corpus using a computer. A typical inverted index is a mapping of keywords to the information items in the corpus that contain or are associated with the key. As one example, an inverted index of the world's publicly accessible web pages may map keywords and keyphrases in the web pages to the subset of the web pages that contain that keyword or keyphrase.

Between the actual physical inverted index itself (e.g., the index data as stored on one or more computers) and the users of the system, a search system or "engine" is typically provided as a software cushion or layer. In essence, the search engine shields the user from knowing or even caring about underlying search engine details. Typically, all requests from users for information in the inverted index are processed by the search engine. For example, information items relevant to a user's request for information can be identified by the search engine using the inverted index, all without user knowledge of the underlying search system implementation. In this manner, the search engine provides users access to relevant information without concern to how the information is indexed or accessed.

One function of a search engine can be to answer to keyword search queries (or just "keyword queries" for short). A keyword query may be defined as a logical expression including a set of one or more search keywords and/or one or more keyphrases, and results in the identification of a subset of indexed information items. Consider, for instance, the handling of a request for information from a search engine. In operation, this request is typically issued by a client system as one or more Hyper Text Transfer Protocol or "HTTP" requests for retrieving particular search results (e.g., a list of Internet web pages containing the words "software" and "engineer") from indexes on server computers. In response to this request, the search engine typically returns a web page containing hyperlinks to those Internet web pages considered to be most relevant to the search terms "software" and "engineer".

Some search engines can answer search queries that express an information need more naturally. These queries are sometimes loosely referred to as "natural language" queries. While there is no precise definition of a natural language query, search engines typically process natural language queries differently from keyword queries. In particular, search engines that process natural language queries typically apply machine learning-based structured prediction techniques to them in order to obtain an understanding of the information need being asked by the query that is deeper understanding than merely understanding (e.g., parsing out) the keywords and keyphrases contained in the query.

Named entity recognition is one structured prediction technique that a search engine can apply to a natural language query in order to obtain an understanding of the query. One example technique for performing named entity recognition that uses conditional random field sequence models is described in the paper by Jenny Rose Finkel, Trond Grenager, and Christopher Manning. 2005. Incorporating Non-local Information into Information Extraction Systems by Gibbs Sampling. Proceedings of the 43nd Annual Meeting of the Association for Computational Linguistics (ACL 2005), pp. 363-370.

With named entity recognition, a search engine may accept an unannotated natural language query as input such as, for example, "software engineer at Acme in 2015," and produce an annotated query as output such as, for example, "[software engineer]$_{job\ title}$ at [Acme]$_{company}$ in [2015]$_{time}$." In this example, as a result of the search engine applying named entity recognition techniques, the query segment "software engineer" is recognized by the search engine as a job title, the query segment "Acme" is recognized by the search engine as a company, and the query segment "2015" is recognized by the search engine as a time.

Using named entity recognition, a search engine can obtain a better understanding of a natural language query and use that better understanding to answer the query with more relevant search results. Returning to the example in previous paragraph, recognizing the segment "software engineer" refers to a job title, "Acme" refers to a company, and "2015" refers to a time, a search engine can identify and return specific search results about specific people with the title of software engineer who worked at Acme in the year 2015, as opposed to returning general search results merely because they are indexed in inverted index by "software engineer," "Acme," and "2015," which might include search results that are not about specific persons who worked as software engineers at Acme in 2015 depending on the information indexed by the index.

While named entity recognition is a very powerful technique for obtaining an understanding of the information needs requested by natural language queries, there are, in some instances, limitations on the extent of the understanding obtained. For example, consider the following two example natural language queries:

1. "people working at Acme"
2. "people with experience in Acme."

The first example natural language query is asking the search engine to find people who work at Acme the software company. The second example natural language query is asking the search engine to find people who have experience with Acme software. For example, Acme the company may produce a complex software product that people summarily refer to as "Acme." In order for the search engine to return the most relevant search results as answers to these natural language queries, it would be useful if the search engine could apply a structured prediction technology that would help the search engine understand that the first query refers to "Acme" as a company and the second query refers to "Acme" as a skill. By doing so, the search engine can return search results for the first query that identify people who work at Acme, the company, and return search results for the second query that identify people who have experience with Acme, the software product. More generally, it would be useful if the search engine could obtain an even deeper understanding of natural language queries so that even more relevant search results can be provided as answers to the queries.

The present invention addresses these and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well understood, routine, or conventional, merely by virtue of their inclusion in this section.

DETAILED DESCRIPTION

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

General Overview

The present invention provides enhanced tagging of natural language queries that are initially segmented and tagged by a named entity recognition system. By doing so, enhanced tagging of a natural language query that represents a deeper understanding of the query is provided. For example, where a named entity recognition system might initially tag the query "people working at Acme" as "people working at [Acme]$_{company}$," the present invention might tag the query as "people working at [Acme]$_{current\ company}$." Here, the tag "current company" enhances the tag "company" with a temporal distinction.

The enhanced tagging of the present invention improves the operation of search engines that use the enhanced tags by enabling the search engine to identify and return more relevant search results in answers to natural language queries. For example, a search engine using the enhanced tag "current company" can use the tag to limit search results to the query "people working at Acme" to only persons who are known to be currently working at Acme, as opposed to, for example, people who worked at Acme in the past but that are now no longer working at Acme.

Named Entity Recognition System

No particular type or configuration of named entity recognition system is required of the present invention. In general, the named entity recognition system can be configured to recognize and tag entities in text. The named entity recognition system can use one or more machine learning sequence models to recognize and tag the entities. In addition, the named entity recognition system can use specialized rule-based components, such as for identifying, tagging, and interpreting times and dates in text. For example, the named entity recognition system can recognize named entities using a series of linear-chain conditional random field (CRF) sequence taggers trained on various corpora. Numerical entities, dates, and times can be recognized using a rule-based system.

The named entity recognition system can be fairly complex and involve phases integrating statistical and rule-based approaches. During a statistical modeling phrase, a series of trained conditional random field (CRF) sequence taggers can be run on input natural language queries. The conditional random field sequence taggers can be trained on large tagged data sets of example natural language queries. Once trained, the sequence taggers can evaluate a natural language query and determine an optimal set of tags. A next phase may handle numeric sequences and time by running a series of rule-based systems. Optional rule-based phases may apply regular expression rules for more fine-grained tagging. A subsequent (e.g., final) phase can combine tagged tokens of the natural language query into segments. Segment detection can be based on the tagging scheme of the named entity recognition system. For example, if a basic inside-outside (IO) tagging scheme is used, a contiguous sequence of tokens with the same tag can be marked as a segment. If a more advanced beginning-inside-outside (BIO), then a contiguous sequence of tokens with the same tag split by a B-tag can be marked as a segment.

The above described named entity recognition system is presented for purposes of illustrating a possible named entity recognition system with which techniques disclosed herein can be implemented. The present invention, however, is not limited to any particular named entity recognition. In particular, the linear-chain conditional random field (CRF) distinction is not necessary to the invention, but is used to provide a framework for discussion. Instead, one skilled in the art will recognize that the present invention can be implemented in a named entity recognition that uses different types of machine learning sequence models (e.g., a recurrent neural network sequence model.)

Baseline Tags

As mentioned, an input natural language query can be initially segmented and tagged by the named entity recognition system. This results in one or more segments of the input query being identified by the named entity recognition system. In addition, for each of the identified segments, the named entity recognition system generates a prediction for each tag in a set of "baseline" tags that the named entity recognition system is trained (e.g., in a supervised learning manner) to generate predictions for. The prediction can be represented numerically. For example, the prediction for each tag in the set of baseline tags can be a real number between 0 and 1 such that the sum of all predictions equals 1. Note that the prediction for same tags in the set of baseline tags can be or assumed to be 0.

For example, consider the example input query "people working at Acme." The named entity recognition system might recognize "Acme" as a segment and generate predictions for each tag in the example set of baseline tags consisting of {"first name," "last name," "school," "company", "skill," and "job title"} that, in this example, the named entity recognition system is trained to generate predictions for. In this example, the named entity recognition system might predict the baseline tag "company" as being the most accurate baseline tag for the segment "Acme" from among the example set of baseline tags.

Three Artificial Neural Network Systems

To accomplish enhanced tagging of a natural language query that is initially segmented and tagged by a named entity recognition system, the present invention combines three artificial neural network systems. Each of the three artificial neural network systems generates a set of enhanced tag predictions for a query segment identified by the named entity recognition system. For each identified query segment of a natural language query, the three sets of enhanced tag predictions generated by the three artificial neural networks for the query segment are mixed together to produce a final output set of enhanced tag predictions for the query segment. Across all identified query segments of the query, the final output sets of enhanced tag predictions can provide a deeper understanding of the natural language query than the sets of baseline tag predictions generated by the named entity recognition system.'

In an implementation, an enhanced tag prediction is an unnormalized output of one of the three artificial neural network systems. For example, an enhanced tag prediction can a logarithmic value output by one of the three artificial neural network systems. In some implementations, an enhanced tag prediction is a probability value between 0 and 1 that is generated by applying a softmax function to an unnormalized output for one of the three artificial neural network systems.

Each of the three artificial neural network systems generates its respective set of enhanced tag predictions for a query segment based on different inputs to accomplish different goals, as explained in greater detail below. However, in brief, the first artificial neural network system generates a first set of enhanced tag predictions for the query segment based on the set of baseline tag predictions generated by the named entity recognition system for the query segment. The second artificial neural network system generates a second set of enhanced tag predictions for the query segment based on one or more pretrained word embeddings for the query segment. The third artificial neural network system generates a third set of enhanced tag predictions for the query segment based on both: (a) a set of one or more pretrained word embeddings generated for one or more words preceding the query segment in a query and (b) a set of one or more pretrained words embeddings generated for one or more words succeeding the query segment in the query. A prediction mixing system mixes (combines) the first set of enhanced tag predictions, the second set of enhanced tag predictions, and the third set of enhanced tag predictions to generate the final output set of enhanced tag predictions for the query segment.

Artificial Neural Network

Each of the three artificial neural network systems can encompass a separately trained artificial neural network. Artificial neural networks are inspired by mammalian brain architecture. Artificial neural networks encompass a simplified model of the biological neuron called an artificial neuron. A network of artificial neurons can be built into an artificial neural network to compute a logical proposition.

There are various different types of artificial neural network architectures and the present invention is not limited to any particular type of artificial neural network architecture. One type of artificial neural network architecture that may be used is the perceptron. The perceptron is based on an artificial neuron known as the linear threshold unit (LTU). The input and output of the LTU are real numbers (as opposed to binary values) and each input connection is associated with a weight. The LTU computes a weighted sum of its inputs, then applies a step function (e.g., the Heaviside step function) to that sum and outputs the result.

A perceptron can be composed of a single layer of LTUs, with each artificial neuron connected to all of the inputs. The connections can be represented using special pass-through neurons called input neurons that output their input. An extra bias feature can also be added. The bias feature can be represented using a special type of neuron called a bias neuron, which outputs the bias.

A perceptron can be trained using a variant of the so-called Hebb's rule which is based on the observation that when a biological neuron triggers another biological neuron, the connection between the two neuron grows stronger. Likewise, a perceptron can process one training instance at a time, and for each instance it makes a prediction. For every output neuron that makes a wrong prediction, the connection weights from the inputs that would have contributed to the correct prediction are reinforced.

Another type of artificial neural network is a multi-layer perceptron which stacks multiple perceptrons. A multi-layer perceptron can be composed of one passthrough input layer, one or more layers of LTUs, called hidden layers, and one final layer of LTUs called the output layer. Every layer except the output layer can include a bias neuron. In addition, every layer except the output layer can be fully connected to the next layer. A multi-layer perceptron that has multiple hidden layers is sometimes referred to as a "deep" artificial neural network. Each of the three artificial neural networks of the present invention can encompass a single hidden layer multi-layer perceptron or a deep artificial neural network.

A multi-layer perceptron can be trained using backpropagation. With backpropagation, the multi-layer perceptron is fed each training instance. And for each training instance the output of every artificial neuron in each consecutive layer is computes in a forward pass. Then the multi-layer perceptron's error is measured. Here, the error may be measured in terms of the difference between the desired final output (e.g., as expressed by a label for the training instance) and the actual final output of the forward pass. Then, then contribution to the error from each artificial neuron in the previous layer is measured and so on until the input layer is reached in a reverse pass. The reverse pass measures the error gradient across all the connection weights in the multi-layer-perceptron by propagating the error gradient backward in the multi-layer perceptron.

Backpropagation may be used with an activation function. Two common activation functions are: (1) the hyperbolic tangent function (tan h), and (2) the rectified linear unit function (ReLU). The tanh function is S-shaped, continuous, and differentiable. The ReLU function is continuous but not differentiable. In practice, the ReLU activation function is often used because its lack of a maximum output value that helps to address some issues during gradient descent.

Each of the three artificial neural networks of the present invention can use tanh or ReLU activation functions. However, the networks of the present invention are not limited to tanh or ReLU activation functions and other activation functions (e.g., a sigmoid function) suitable for the requirements of the particular implementation at hand can be used.

Enhanced Tags

Each set of enhanced tag predictions generated by the three artificial neural networks can be for a set of enhanced tags that enhance the set of baseline tags. For example, the set of enhanced tags for the above-example set of baseline tags might include temporally related enhancements for the baseline tags "school," "job title," and "company". For example, the set of enhanced tags might consist of the following enhanced tags: {"first name," "last name," "past school", "current school," "past or current school," "past company", "current company," "past or current company", "skill," "past job title," "current job title," and "past or current job title"}.

It should be noted that no particular set or number of baseline tags and no particular set or number of enhanced tags are required by the present invention. Indeed, the set of baseline tags and the set of enhanced tags can be domain-specific according to the requirements of the particular implementation at hand. For example, the set of baseline tags and the set of enhanced tags for a professional social networking domain might comprise the example baseline and enhanced tags discussed above. However, other types of social networks can have different sets of baseline and enhanced tags.

Social Network

Herein, the term "social network" will be used broadly to refer to any type of network representing connections or relationships between users of an online service that facilitates online user interaction or online user collaboration via the online service. For example, a social network can encompass any of a friends and family social network (e.g., Facebook™, Twitter™, Google+™, MySpace™, or the like), a multimedia sharing social network (e.g., YouTube™, Flickr™, Instagram™, or the like), a professional social network (e.g., LinkedIn™, Classroom 2.0™, or the like), or an informational social network (e.g., Quora™, Nextdoor™, or the like).

The techniques disclosed herein are not limited to any particular type of social network, and the techniques can be applied in the context of a variety of different types of social networks, including any of the example types of social networks listed in the prior paragraph.

Enhanced Tagging System

Figure 1:
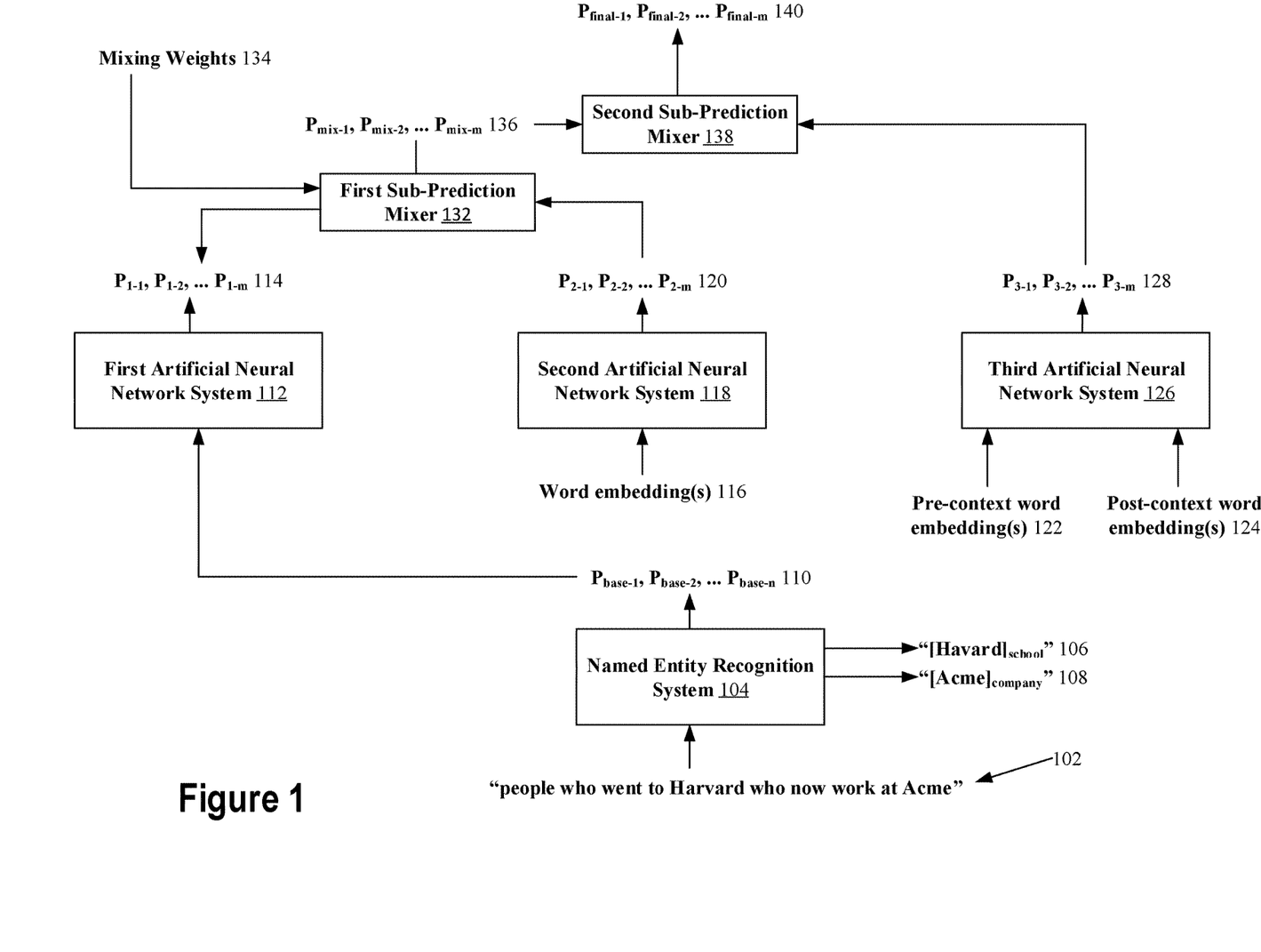
FIG. 1 schematically depicts an example enhanced tagging system in accordance with the present invention.

FIG. 1 schematically depicts example enhanced tagging computing system 100. System 100 uses named entity recognition system 102 and includes first artificial neural network system 112, second artificial neural network system 118, third artificial neural network system 126, and prediction mixing system 130. Each of these systems 102, 112, 118, 126, and 130 can be implemented on one or more computer systems.

Example natural language query 102 is input to named entity recognition system 104. Natural language query 102 is simply one example of a possible natural language query and is not intended to be limiting of the types of natural language queries that can be processed by enhanced tagging system 100. In this example, natural language query 102 is asking for search results pertaining to people who went to Harvard, the college, and who now work at Acme, the company.

Named entity recognition system 104 can apply structured prediction techniques to identify and tag segments 106 and 108 in natural language query 102. In this example, segment 106 "Harvard" is tagged as a "school" and segment 108 "Acme" is tagged as a "company" by named entity recognition system 104. Note that while in this example, each segment 106 and 108 is a single word segment, multi-word segments are also possible. For example, if natural language query 102 recited "Harvard College" instead of just "Harvard," then named entity recognition system might have identified "Harvard College" as a single segment and tagged it as "school."

Named entity recognition system 104 generates set of baseline tag predictions 110 for a set of baseline tags that includes the tags "school" and "company." The set of baseline tags may also include other baseline tags such as, for example, "first name," "last name," "job title," etc. Each prediction of set of baseline tag predictions 110 is for one tag of the set of baseline tags.

Once named entity recognition system 104 identifies a query segment (e.g., 106) and generates set of baseline tag predictions 110 for the query segment (e.g., 106), first artificial neural network system 112 generates first set of enhanced tag predictions 114 for the query segment (e.g., 106) based on set of baseline tag predictions 110 output by named entity recognition system 104 for the query segment (e.g., 106).

Each prediction of first set of enhanced tag predictions 114 is for one tag of a set of enhanced tags. As a non-limiting example, the set of enhanced tags might consist of the following enhanced tags: {"first name," "last name," "past school", "current school," "past or current school," "past company", "current company," "past or current company", "skill," "past job title," "current job title," and "past or current job title"}.

The baseline tag predicted as most accurate (highest probability) by named entity recognition system 104 can be accurate but also can be wrong. For example, named entity recognition system 104 might predict the baseline tag "school" as the most accurate baseline tag for segment 108 "Acme" in the query 102, instead of correctly predicting the baseline tag "company" as the most accurate baseline tag for segment 108 as it did in the example of FIG. 1. This wrong prediction (assuming Acme is a company and not a school) by named entity recognition system 104 can cause first artificial neural network system 112 to generate a wrong enhanced tag prediction. For example, first artificial neural network system 112 might predict one or more of the school-related enhanced tags (e.g., "past school", "current school," or "past or current school") as a more accurate enhanced tag or tags for segment 108 "Acme" than any of the company-related enhanced tags (e.g., "past company", "current company," or "past or current company") based on named entity recognition system 104's wrong prediction of the baseline tag "school."

Second artificial neural network system 118 is used to adjust first set of enhanced tag predictions 114 generated by first artificial neural network system 112 for a query segment (e.g., 106). In particular, second artificial neural network system 118 generates second set of enhanced tag predictions 120 for the query segment (e.g., 106) based on one or more pretrained word embeddings/vectors 116 for the query segment (e.g., 106). In particular, a pretrained word vector is obtained from a set of pretrained word embeddings for each word of the query segment (e.g., 106). For example, for segment 106, the pretrained word vector for the word "Harvard" can be obtain from the set of pretrained word embeddings. Likewise, for segment 108, the pretrained word vector for the word "Acme" can be obtained from the set of pretrained word embeddings. Pretrained word embeddings are useful to represent the meaning of keywords and keyphrases as "word" vectors of real numbers in a vector space in which the distance between vectors in the vector space corresponds to the extent of semantic similarity between the keywords or keyphrases the vectors represent.

Non-limiting examples of pretrained word embeddings that can be used as the set of pretrained word embeddings include Word2vec word vectors and GloVe word vectors. More information on word vectors and Word2vec is available in the paper by Thomas Mikolov, Kai Chen, Gregory S. Corrado, and Jeffrey Dean, 2013, "Efficient Estimation of Word Representations in Vector Space," Computing Research Repository, arXiv:1301.3781, the entire contents of which is hereby incorporated by reference. More information on GloVe is available in the paper by Jeffrey Pennington, Richard Socher, and Christopher D. Manning, 2014, "GloVe: Global Vectors for Word Representation," Proceedings of the 2014 Conference on Empirical Methods in Natural Language Processing (EMNLP)," the entire contents of which is hereby incorporated by reference.

By generating second set of enhanced tag predictions 120 based on the pretrained word embedding(s)/vector(s) 116 for the query segment (e.g., 106), second artificial neural network system 118 is useful to disambiguate first set of enhanced tag predictions 114 generated by first artificial neural network system 112. For example, first artificial neural network system 112 might predict the school-related enhanced tags and the company-related enhanced tags with close to equal probability as being the most accurate enhanced tags for segment 106 "Acme." However, second artificial neural network system 118 might predict the company-related enhanced tags with significantly greater probability as being the more accurate enhanced tags based on second artificial neural network system 118 being trained to predict the company-related enhanced tags for input words embeddings for the keyword "Acme."

Like first set of enhanced tags 114, each prediction of second set of enhanced tag predictions 120 is for one tag in the set of enhanced tags.

First sub-prediction mixer 132 combines first set of enhanced tag predictions 114 and second set of enhanced tag predictions 120 to generate set of mixed enhanced tag predictions 136. In particular, sub-prediction mixer 132 can combine first set of enhanced tag predictions 114 and second set of enhanced tag predictions 120 on a prediction by prediction basis (i.e., enhanced tag by enhanced tag basis) to produce set of mixed enhanced tag predictions 136. As a result, set of mixed enhanced tag predictions 136 includes one prediction value for each tag in the set of enhanced tags after first sub-prediction mixer 132 combines first set of enhanced tag predictions 114 and second set of enhanced tag predictions 120.

When first sub-prediction mixer 132 combines a prediction (e.g., $P_2^1$) from first set of enhanced tag predictions 114 with the corresponding prediction (e.g., $P_2^2$) from second set of enhanced tag predictions 120 to generate the corresponding prediction (e.g., $P_2^{Mix}$) for set of mixed enhanced tag predictions 136, the prediction (e.g., $P_2^1$) from the set of enhanced tag predictions 114 can be added (+) to (if the predictions are logits) or multiplied (X) by (if the predictions are probability values) the corresponding prediction (e.g., $P_2^2$) from second set of enhanced tag predictions 120 to generate the corresponding prediction (e.g., $P_2^{Mix}$) for set of mixed enhanced tag predictions 136.

Mixing weights 134 can include a weight value for each tag in the set of enhanced tags. Mixing weights 134 can reflect the possibility that word embeddings for some types of entities can be more predictive of the correct enhanced tag than web embeddings for other types of entities. For example, word embeddings for a person's first or last name can be more predictive of a "first name" or "last name" enhanced tag because a person's first name or last name is less likely to have multiple meanings than other words for other types of entities (e.g., company names, job titles). On the other hand, as another example, word embeddings for a company name can be less predictive of a "past company," "current company," or "past or current company" enhanced tag because a company name can refer to the company itself or a skill that a person who is an expert with a product produced by company has. Accordingly, when first sub-prediction mixer 132 mixes first set of enhanced tag predictions 114 and second set of enhanced tag predictions 118 into set of mixed enhanced tag predictions 136, the mixing weight for an enhanced tag can penalize an enhanced tag prediction for the enhanced tag if word embeddings for the enhanced tag are less predictive of the enhanced tag. On the other hand, the mixing weight for an enhanced tag can be reinforced or boosted if word embeddings for the enhanced tag are more predictive for the enhanced tag.

A mixing weight of mixing weights 134 can be a real numbered value between zero and one inclusive. Penalizing an enhanced tag prediction can include multiplying the original prediction value by a mixing weight less than one that brings the prediction closer to zero than the original prediction value. On the other hand, reinforcing or boosting an enhanced tag prediction can include multiplying the original prediction value by a mixing weight equal to or greater than one such that the prediction is reinforced or boosted.

Mixing weights 134 can be predefined or learned during training of second artificial neural network 118. For example, when training second artificial neural network 118, each of a set of mixing weights can be set to a respective initial value. The respective initial value can be 0.5, for example, or a random value between [0, 1) or [0,1] or (x, y) where x is greater than zero and y is less than 1. Then, the mixing weights can be adjusted during training.

Mixing weights 134 can be applied by first sub-prediction mixer 132 to second set of enhanced tag predictions 120 before combing first set of enhanced tag predictions 114 and second set of enhanced tag predictions 120 or to set of mixed enhanced tag predictions 136 after combing first set 114 and second set 120.

First artificial neural network 112 can be trained based on a first set of training examples. Each training example can include a set of baseline tag predictions generated by named entity recognition system 104 for a respective sample query segment. Each training example can be labeled with a set of enhanced tag predictions for the respective sample query segment.

Second artificial neural network 120 can be trained based on a second set of training examples. Each training example can include a set of one or more pretrained word embeddings from the set of pretrained word embeddings for a respective sample query segment. Each training example can be labeled with a set of enhanced tag predictions for the respective sample query segment.

The set of mixed enhanced tag predictions 136 can be mixed by second sub-prediction mixer 138 with third set of enhanced tag predictions 128. Third set of enhanced tag predictions 128 are generated by third artificial neural network 126 based on the context surrounding the current query segment (e.g., 106) in query 102. By doing so, final output set of enhanced tag predictions 140 better predict the most accurate enhanced tag for the current query segment (e.g., 106) based on the context in which the current query segment appears in query 102.

To do this, "pre-context" pretrained word embeddings 122, from the set of pretrained word embeddings, for a number of words preceding the current query segment (e.g., 106) in query 102 and "post-context" pretrained word embeddings 124, from the set of pretrained word embeddings, for a number of words following the current query segment (e.g., 106) in query 102 are input to third artificial neural network 126. From the input pretrained word embeddings 122 and 124, trained third artificial neural network 126 generates third set of enhanced tag predictions 128.

Each of pre-context pretrained word embeddings 122 is for a word within a number (e.g., the two to five closest words) of the closest words in query 102 preceding the current query segment in query 102. The number of closest words selected can be predefined and can range variously according to the requirements of the particular implementation at hand but typically is greater than one and less than ten. For example, the if the number of closest words selected is three, then pre-context pretrained word embeddings 122 for segment 106 "Harvard" can contain a pretrained word vector for the word "who," another pretrained word vector for the word "went," and yet another pretrained word vector for the word "to," as those are the three words that precede "Harvard" in query 102.

Likewise, each of post-context pretrained word embeddings 124 is for a word within a number (e.g., the two to five closest words) of the closest words in query 102 following the current query segment in query 102. The number of closest words selected can be predefined and can range variously according to the requirements of the particular implementation at hand but typically is greater than one and less than ten. For example, the if the number of closest words selected is three, then post-context pretrained word embeddings 124 for segment 106 "Harvard" can contain a pretrained word vector for the word "who," another pretrained word vector for the word "now," and yet another pretrained word vector for the word "word," as those are the three words that follow "Harvard" in query 102.

If a pre-trained word vector is not available for a pre-context or post-context word because the word is a rare word or for another reason, then a default word vector (e.g., a zero vector) can be used. Likewise, if the current query segment appears at the beginning or the end of the query such that there are less than the predetermined number of words preceding or following the query segment in the query, then the default word vector can be used for each of the missing words. For example, for query segment 108 "Acme" of query 102, the default word vector may be used for each of the predetermined number of post-context word embeddings 124. These uses of the default word vector can also be used during training of third artificial neural network 126. As another example, if the predetermined number of pre-context word embeddings 122 is five (5), then the first word vector of pre-context word embeddings 122 would be the default word vector because there are only four words preceding segment 106 "Harvard" in query 102.

Third artificial neural network 126 can be trained based on a third set of training examples. Each training example can include a set of pre-context pretrained word embeddings and a set of post-context pretrained word embeddings for a respective sample query segment. Each training example can be labeled with a set of enhanced tag predictions for the respective sample query segment.

Second sub-prediction mixer 138 combines mixed enhanced tag predictions 136 and third set of enhanced tag predictions 128 to generate final output set of enhanced tag predictions 140. In particular, sub-prediction mixer 138 can combine mixed enhanced tag predictions 136 and third set of enhanced tag predictions 128 on a prediction by prediction basis (i.e., enhanced tag by enhanced tag basis) to produce final output set of enhanced tag predictions 140. As a result, final output set of enhanced tag predictions 140 includes one prediction value for each tag in the set of enhanced tags after second sub-prediction mixer 138 combines mixed enhanced tag predictions 136 and third set of enhanced tag predictions 128.

When second sub-prediction mixer 128 combines a prediction (e.g., $P_2^{mix}$) from set of mixed enhanced tag predictions 136 with the corresponding prediction (e.g., $P_2^3$) from third set of enhanced tag predictions 128 to generate the corresponding prediction (e.g., $P_2^{final}$) for set of final output enhanced tag predictions 140, the prediction (e.g., $P_2^{mix}$) from the set of mixes enhanced tag predictions 136 can be added (+) to or multiplied (X) by the corresponding prediction (e.g., $P_2^3$) from third set of enhanced tag predictions 128 to generate the corresponding prediction (e.g., $P_2^{final}$) for set of final output enhanced tag predictions 140.

Example Operation

In an implementation, first artificial neural network 112 and second artificial neural network 118 or the first 112, second 118, and third 126 artificial neural networks are jointly trained together with one set of training examples. The combined network learns mixing weights 134 and respective model parameters for each of first 112, second 118, and third 126 networks.

First network 112 can be trained to pass through input data in a soft fashion at prediction time. For example, the input probabilities for a set of baseline tags may be proportionally spread over a set of enhanced tags that are refinements (sub-classes) of the set of baseline tags. For example, if the input probabilities for a set of baseline tags are {"company": 50%, "school": 50%}, then the output probability of first network 112 might be {"current_company": 33%, "past_company", 33%, "current_or_past_company": 34%, "current_school": 33%, "past_school": 33%, "current_or_past_school": 34%}.

Second network 118 can be trained to make use of the meaning of keywords and keyphrases of a query segment where the meaning is represented by word embeddings for the keywords and keyphrases. As a result, second network 118 might predict that a query segment is a school rather than a company, for example, because of the meaning of the keywords and keyphrases of the segment according to the word embeddings. For example, second network 112 might predict {"current_company": 0%, "past_company", 0%, "current_or_past_company": 0%, "current_school": 33%, "past_school": 33%, "current_or_past_school": 34%}.

The output of first network 112 is mixed with output of second network 118 using the learned mixing weights 134 to product an intermediate output. For example, the intermediate output might be {"current_company": 1%, "past_company", 1%, "current_or_past_company": 1%, "current_school": 32%, "past_school": 32%, "current_or_past_school": 33%}. The intermediate output is mixed with the output of the third network 126 to produce a final output. The third network 126 takes into account the meaning of keywords and keyphrases surrounding the query segment in the query where the meaning of the keywords and keyphrases surrounding the query segment in the query is represented by word embedded. For example, third network 126 might output {"current_company": 0%, "past_company", 0%, "current_or_past_company": 0%, "current_school": 90%, "past_school": 10%, "current_or_past_school": 0%}. When the intermediate output is mixed with the output of third network 126, the final output might be {"current_company": 1%, "past_company", 1%, "current_or_past_company": 1%, "current_school": 95%, "past_school": 1%, "current_or_past_school": 1%}.

It should be understood that while in this example percentages are used for purposes of providing a clear example, real numbered probability values may be used in a practical implementation. In addition, or alternatively, real numbered logits may be used instead of real numbered probability values.

Example Process

Figure 2:
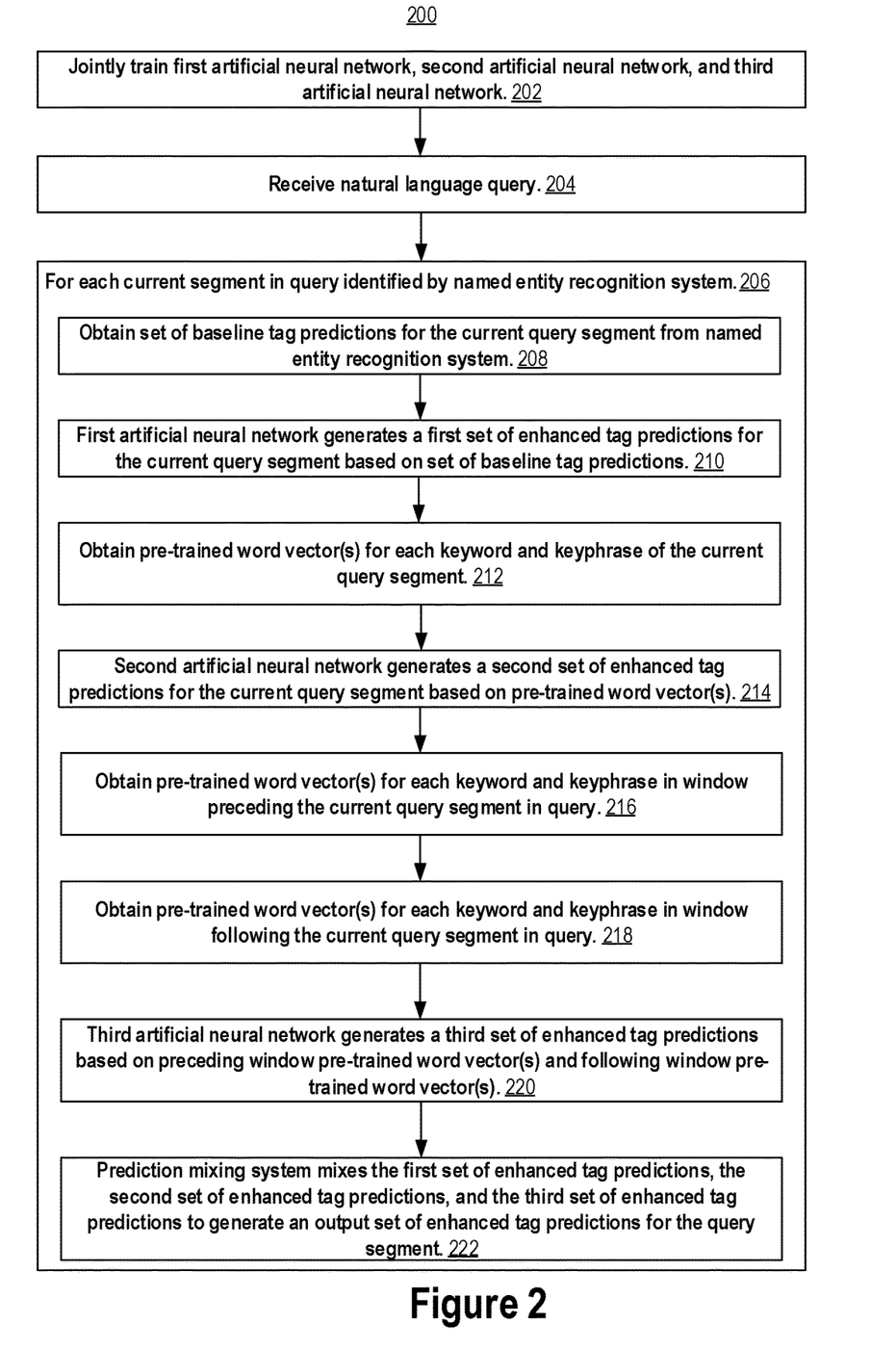
FIG. 2 is a flowchart of an example process for enhanced natural language query segment tagging.

FIG. 2 is a flowchart of example process 200 for enhanced natural language query segment tagging.

At operation 202, a first artificial neural network system (e.g., 112), a second artificial neural network system (e.g., 118), and a third artificial neural network system (e.g., 126) are jointly trained based on a set of training examples. Each training example in the set of training examples can correspond to a sample natural language query. Each training example can be associated with a set of enhanced tag predictions as the label for the training example.

At operation 204, after the networks are jointly trained, a natural langue query to process is received. For example, the query "people who went to Harvard who now work at Acme" might be received. The query received 204 is input to a named entity recognition system (e.g., 104) and a set of one or more query segments is received as output. For each of the one or more query segments received as output from the named entity recognition system, a set of one or more baseline tag predictions is also received as output from the named entity recognition system. For example, the named entity recognition system might identify the query segments "Harvard" and "Acme" in the query "people who went to Harvard who now work at Acme," among other segments of the query that the named entity recognition system might identify.

Operations 208-222 can be performed for each query segment in the query identified by the named entity recognition system 206.

At operation 208, the set of baseline tag predictions for the current query segment is obtained.

At operation 210, the first artificial neural network generates a first set of enhanced tag predictions for the current query segment based on the set of baseline tag predictions for the current query segment.

At operation 212, one or more pre-trained word vectors are obtained. One pre-trained word vector is obtained for each keyword and keyphrase of the current query segment.

At operation 214, the second artificial neural network generates a second set of enhanced tag predictions for the current query segment based on the one or more pre-trained word vectors obtained 212.

At operation 216, a pre-trained word vector is obtained for each keyword and keyphrase in a window preceding the current query segment in the query. For example, the window may be the preceding two, three, or five keywords and keyphrases. If there are not that many keywords or keyphrases preceding the current query segment in the query (e.g., because the current query segment is near the beginning of the query), then a default word vector (e.g., a zero vector) can be used for each missing keyword or keyphrase in the window.

At operation 218, like at operation 216, a pre-trained word vector is obtained for each keyword and keyphrase in a window following the current query segment in the query. For example, the window may be the following two, three, or five keywords and keyphrases. If there are not that many keywords or keyphrases following the current query segment in the query (e.g., because the current query segment is near the end of the query), then a default word vector (e.g., a zero vector) can be used for each missing keyword or keyphrase in the window.

At operation 220, the third artificial neural network generates a third set of enhanced tag predictions based on the pre-trained word vectors obtained 216 for the preceding window and the pre-trained word vectors obtained 218 for the following window.

At operation 22, a final output set of enhanced tag predictions is generated by a prediction mixing system (e.g., 132 and 134) by mixing the first set of enhanced tag predictions generated 210, the second set of enhanced tag predictions generated 214, and the third set of enhanced tag predictions 220.

In the above process 200, if a pre-trained word vector is not available for a particular keyword or keyphrase (e.g., because it is a rare keyword or keyphrase), then a default word vector (e.g., a zero vector) can be used instead.

Computing System Implementation

An implementation of the present invention may encompass performance of a method by a computing system having one or more processors and storage media. The one or more processors and the storage media may be provided by one or more computer systems. An example computer system is described below with respect to FIG. 3. The storage media of the computing system may store one or more computer programs. The one or more programs may include instructions capable of performing and configured to perform the method when executed by the one or more processors.

An implementation of the present invention may encompass one or more non-transitory computer-readable media. The one or more non-transitory computer-readable media may store the one or more computer programs that include the instructions which, when executed by one or more processors of a computing system, are capable of causing the computing system to perform the method.

An implementation of the present invention may encompass the computing system having the one or more processors and the storage media storing the one or more computer programs that include the instructions capable of performing and configured to perform the method when executed by the one or more processors.

An implementation of the present invention may encompass one or more virtual machines that operate on top of one or more computer systems and emulate virtual hardware. A virtual machine can be a Type-1 or Type-2 hypervisor, for example. Operating system virtualization using containers is also possible instead of, or in conjunction with, hardware virtualization using hypervisors.

For an implementation that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive. For example, one set of computer systems may store the one or more computer programs from which another, different set of computer systems downloads the one or more computer programs and executes the instructions thereof.

Figure 3:
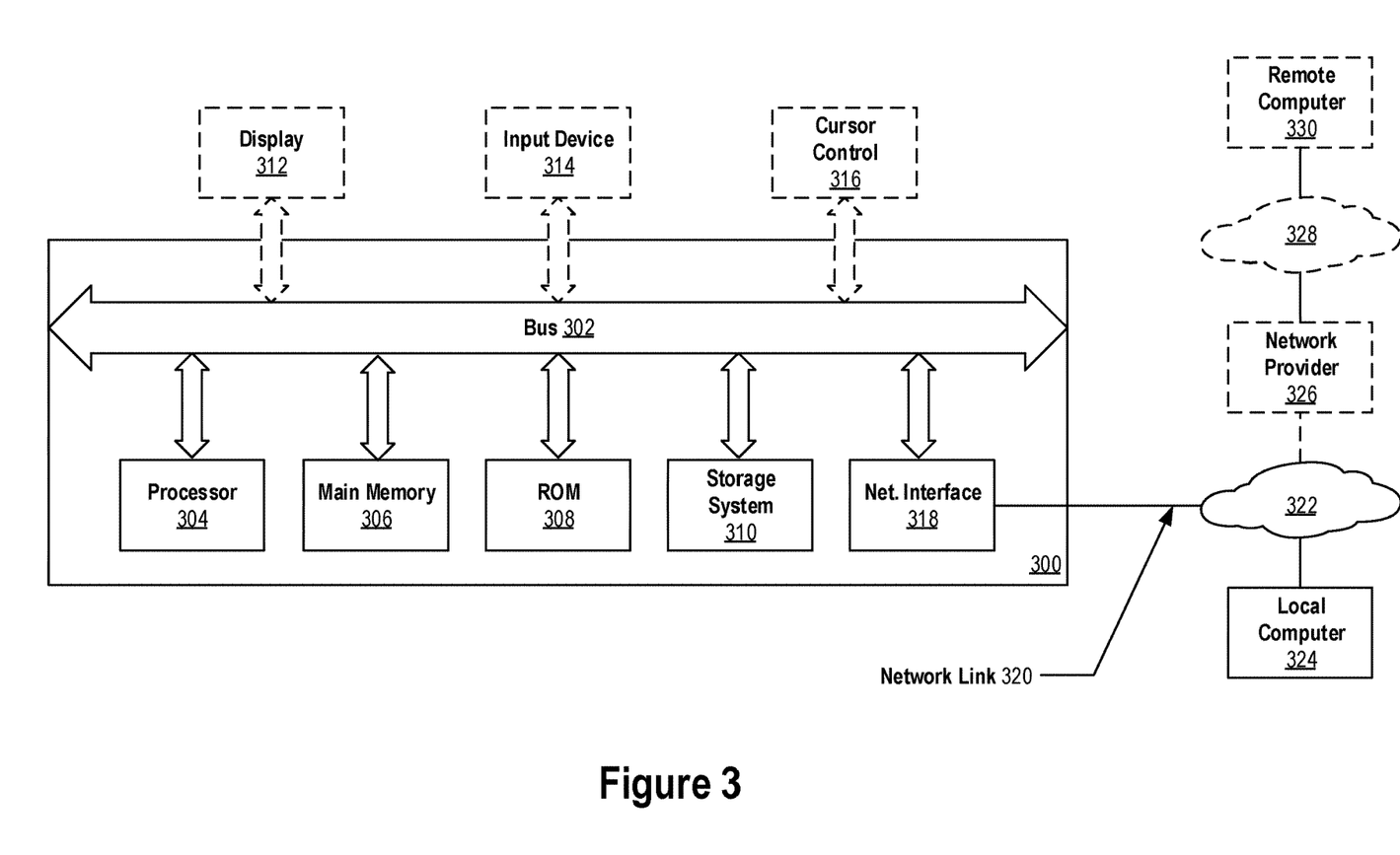
FIG. 3 is a block diagram of a computer system that can be used in a computing system implementation of the present invention.

FIG. 3 is a block diagram of example computer system 300 used in an implementation of the present invention. Computer system 300 includes bus 302 or other communication mechanism for communicating information, and one or more hardware processors coupled with bus 302 for processing information.

Hardware processor 304 may be, for example, a general-purpose microprocessor, a central processing unit (CPU) or a core thereof, a graphics processing unit (GPU), or a system on a chip (SoC).

Computer system 300 also includes a main memory 306, typically implemented by one or more volatile memory devices, coupled to bus 302 for storing information and instructions to be executed by processor 304. Main memory 306 also may be used for storing temporary variables or other intermediate information during execution of instructions by processor 304.

Computer system 300 may also include read-only memory (ROM) 308 or other static storage device coupled to bus 302 for storing static information and instructions for processor 304.

A storage system 310, typically implemented by one or more non-volatile memory devices, is provided and coupled to bus 302 for storing information and instructions.

Computer system 300 may be coupled via bus 302 to display 312, such as a liquid crystal display (LCD), a light emitting diode (LED) display, or a cathode ray tube (CRT), for displaying information to a computer user. Display 312 may be combined with a touch sensitive surface to form a touch screen display. The touch sensitive surface may be an input device for communicating information including direction information and command selections to processor 304 and for controlling cursor movement on display 312 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 314, including alphanumeric and other keys, may be coupled to bus 302 for communicating information and command selections to processor 304.

Another type of user input device may be cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Instructions, when stored in non-transitory storage media accessible to processor 304, such as, for example, main memory 306 or storage system 310, render computer system 300 into a special-purpose machine that is customized to perform the operations specified in the instructions. Alternatively, customized hard-wired logic, one or more ASICs or FPGAs, firmware and/or hardware logic which in combination with the computer system causes or programs computer system 300 to be a special-purpose machine.

A computer-implemented process may be performed by computer system 300 in response to processor 304 executing one or more sequences of one or more instructions contained in main memory 306. Such instructions may be read into main memory 306 from another storage medium, such as storage system 310. Execution of the sequences of instructions contained in main memory 306 causes processor 304 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 310) and/or volatile media (e.g., main memory 306). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 302. Transmission media can also take the form of acoustic or light waves, such as those generated during radio-wave and infra-red data communications.

Computer system 300 also includes a network interface 318 coupled to bus 302. Network interface 318 provides a two-way data communication coupling to a wired or wireless network link 320 that is connected to a local, cellular or mobile network 322. For example, communication interface 318 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. In an implementation, communication interface 318 sends and receives electrical, electromagnetic or optical signals that carry digital data streams representing various types of information.

Network link 320 typically provides data communication through one or more networks to other data devices. For example, network link 320 may provide a connection through network 322 to local computer system 324 that is also connected to network 322 or to data communication equipment operated by a network access provider 326 such as, for example, an internet service provider or a cellular network provider. Network access provider 326 in turn provides data communication connectivity to another data communications network 328 (e.g., the internet). Networks 322 and 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the networks 322 and 328, network link 320 and communication interface 318. In the internet example, a remote computer system 330 might transmit a requested code for an application program through network 328, network 322 and communication interface 318. The received code may be executed by processor 304 as it is received, and/or stored in storage device 310, or other non-volatile storage for later execution.

CONCLUSION

In the foregoing detailed description, the present invention has been described with reference to numerous specific details that may vary from implementation to implementation. The detailed description and the figures are, accordingly, to be regarded in an illustrative rather than a restrictive sense.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

For situations in which implementations discussed above collect information about users, the users may be provided with an opportunity to opt in or out of programs or features that may collect personal information. In addition, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized rather than associated with a particular user. For example, the user preferences or user interactions may be generalized based on user demographics.

The invention claimed is:

1. A computing system comprising:
a first artificial neural network system comprising at least one processor capable of executing instructions comprising generating a first set of enhanced tag predictions for a query segment of a natural language query based on a set of baseline tag predictions generated for the query segment by a named entity recognition system, wherein the first artificial neural network system is trained using a first training data set comprising a set of baseline tag predictions;
a second artificial neural network system comprising at least one processor capable of executing instructions comprising generating a second set of enhanced tag predictions for the query segment based on a set of one or more pretrained word vectors obtained for the query segment, wherein the second artificial neural network system is trained using a second training data set comprising a set of one or more pretrained word embeddings from the set of pretrained word embeddings for a respective sample query segment;
a third artificial neural network system comprising at least one processor capable of executing instructions comprising generating a third set of enhanced tag predictions for the query segment based on both: (a) a set of pre-context pretrained word vectors obtained for words preceding, within a number, the query segment in the natural language and (b) a set of post-context pretrained word vectors for words following, within the number, the query segment in the natural language query, wherein the third artificial neural network is trained using a set of pre-context pretrained word embeddings and a set of post-context pretrained word embeddings for a respective sample query segment; and
a prediction mixing system capable of mixing the first set of enhanced tag predictions, the second set of enhanced tag predictions, and the third set of enhanced tag predictions to generate an output set of enhanced tag predictions for the query segment, wherein the prediction mixing system comprises a sub-prediction mixer that includes a set of mixing weights that are learned during a training of the second artificial neural network system.

2. The system of claim 1, wherein:
each prediction of the set of baseline tag predictions is a probability value, and
each prediction of the first set of enhanced tag predictions is a probability value.

3. The system of claim 1, wherein:
each prediction of the set of baseline tag predictions is a logit value, and
each prediction of the first set of enhanced tag predictions is a logit value.

4. The system of claim 1, wherein the prediction mixing system is capable of:
mixing the first set of enhanced tag predictions with the second set of enhanced tag predictions based on a set of learned mixing weights to generate an intermediate set of enhanced tag predictions; and
mixing the intermediate set of enhanced tag predictions with the third set of enhanced tag predictions to generate the output set of enhanced tag predictions for the query segment.

5. The system of claim 1, wherein the query segment comprises a word; and wherein the second artificial neural network system is capable of generating the second set of enhanced tag predictions for the query segment based on a pretrained word vector obtained for the word.

6. The system of claim 1, wherein the query segment comprises a plurality of words; and wherein the second artificial neural network system is capable of generating the second set of enhanced tag predictions for the query segment based on a respective pretrained word vector obtained for each word of the plurality of words.

7. A method comprising:
a first artificial neural network system generating a first set of enhanced tag predictions for a query segment of a natural language query based on a set of baseline tag predictions generated for the query segment by a named entity recognition system, wherein the first artificial neural network system is trained using a first training data set comprising a set of baseline tag predictions;

a second artificial neural network system generating a second set of enhanced tag predictions for the query segment based on a set of one or more pretrained word vectors obtained for the query segment, wherein the second artificial neural network system is trained using a second training data set comprising a set of one or more pretrained word embeddings from the set of pretrained word embeddings for a respective sample query segment;

a third artificial neural network system generating a third set of enhanced tag predictions for the query segment based on both: (a) a set of pre-context pretrained word vectors obtained for words preceding, within a number, the query segment in the natural language query and (b) a set of post-context pretrained word vectors for words following, within the number, the query segment in the natural language query, wherein the third artificial neural network is trained using a set of pre-context pretrained word embeddings and a set of post-context pretrained word embeddings for a respective sample query segment; and a prediction mixing system mixing the first set of enhanced tag predictions, the second set of enhanced tag predictions, and the third set of enhanced tag predictions to generate an output set of enhanced tag predictions for the query segment, wherein the prediction mixing system comprises a sub-prediction mixer that includes a set of mixing weights that are learned during a training of the second artificial neural network system.

8. The method of claim 7, wherein:
each prediction of the set of baseline tag predictions is a probability value, and
each prediction of the first set of enhanced tag predictions is a probability value.

9. The method of claim 7, wherein:
each prediction of the set of baseline tag predictions is a logit value, and
each prediction of the first set of enhanced tag predictions is a logit value.

10. The method of claim 7, further comprising:
the prediction mixing system mixing the first set of enhanced tag predictions with the second set of enhanced tag predictions based on a set of learned mixing weights to generate an intermediate set of enhanced tag predictions; and
the prediction mixing system mixing the intermediate set of enhanced tag predictions with the third set of enhanced tag predictions to generate the output set of enhanced tag predictions for the query segment.

11. The method of claim 7, wherein the query segment comprises a word; and wherein the method further comprises the second artificial neural network system generating the second set of enhanced tag predictions for the query segment based on a pretrained word vector obtained for the word.

12. The method of claim 7, wherein the query segment comprises a plurality of words; and wherein the method further comprises the second artificial neural network system generating the second set of enhanced tag predictions for the query segment based on a respective pretrained word vector obtained for each word of the plurality of words.

13. The method of claim 7, further comprising jointly training the first artificial neural network, the second artificial neural network, and the third artificial neural network based on a set of training examples.

14. The method of claim 7, wherein a particular enhanced tag prediction of the output set of enhanced tag predictions corresponds to a particular enhanced tag that is a temporal refinement of a particular baseline tag.

15. One or more non-transitory computer-readable media storing instructions which, when executed by one or more processors, causes the one or more processors to perform:
a first artificial neural network system generating a first set of enhanced tag predictions for a query segment of a natural language query based on a set of baseline tag predictions generated for the query segment by a named entity recognition system, wherein the first artificial neural network system is trained using a first training data set comprising set of baseline tag predictions;

a second artificial neural network system generating a second set of enhanced tag predictions for the query segment based on a set of one or more pretrained word vectors obtained for the query segment, wherein the second artificial neural network system is trained using a second training data set comprising a set of one or more pretrained word embeddings from the set of pretrained word embeddings for a respective sample query segment;

a third artificial neural network system generating a third set of enhanced tag predictions for the query segment based on both: (a) a set of pre-context pretrained word vectors obtained for words preceding, within a number, the query segment in the natural language query and (b) a set of post-context pretrained word vectors for words following, within the number, the query segment in the natural language query, wherein the third artificial neural network is trained using a set of pre-context pretrained word embeddings and a set of post-context pretrained word embeddings for a respective sample query segment; and a prediction mixing system mixing the first set of enhanced tag predictions, the second set of enhanced tag predictions, and the third set of enhanced tag predictions to generate an output set of enhanced tag predictions for the query segment, wherein the prediction mixing system comprises a sub-prediction mixer that includes a set of mixing weights that are learned during a training of the second artificial neural network system.

16. The one or more non-transitory computer-readable of claim 15, wherein:
each prediction of the set of baseline tag predictions is a probability value, and
each prediction of the first set of enhanced tag predictions is a probability value.

17. The one or more non-transitory computer-readable of claim 15, wherein:
each prediction of the set of baseline tag predictions is a logit value, and
each prediction of the first set of enhanced tag predictions is a logit value.

18. The one or more non-transitory computer-readable of claim 15, the instructions, when executed by the one or more processors, causes the one or more processors to perform:
the prediction mixing system mixing the first set of enhanced tag predictions with the second set of enhanced tag predictions based on a set of learned mixing weights to generate an intermediate set of enhanced tag predictions; and the prediction mixing system mixing the intermediate set of enhanced tag predictions with the third set of enhanced tag predictions to generate the output set of enhanced tag predictions for the query segment.

19. The one or more non-transitory computer-readable of claim 15, wherein the query segment comprises a word; and wherein the instructions, when executed by the one or more processors, causes the one or more processors to perform the second artificial neural network system generating the second set of enhanced tag predictions for the query segment based on a pretrained word vector obtained for the word.

20. The one or more non-transitory computer-readable of claim 15, wherein the query segment comprises a plurality of words; and wherein the instructions, when executed by the one or more processors, causes the one or more processors to perform the second artificial neural network system generating the second set of enhanced tag predictions for the query segment based on a respective pretrained word vector obtained for each word of the plurality of words.

* * * * *